US012598176B2

(12) United States Patent
Jain et al.

(10) Patent No.: US 12,598,176 B2
(45) Date of Patent: Apr. 7, 2026

(54) TOKEN VALIDATION FOR EVENT PROCESSING APPROVAL

(71) Applicant: Bank of America Corporation, Charlotte, NC (US)

(72) Inventors: Jeetendra Hukmichand Jain, Charlotte, NC (US); Bradley Holland, Bellingham, WA (US)

(73) Assignee: Bank of America Corporation, Charlotte, NC (US)

( * ) Notice: Subject to any disclaimer, the term of this patent is extended or adjusted under 35 U.S.C. 154(b) by 141 days.

(21) Appl. No.: 18/242,765

(22) Filed: Sep. 6, 2023

(65) Prior Publication Data

US 2025/0080523 A1     Mar. 6, 2025

(51) Int. Cl.
*H04L 9/40* (2022.01)

(52) U.S. Cl.
CPC .................................. *H04L 63/083* (2013.01)

(58) Field of Classification Search
CPC ...................................................... H04L 63/083
See application file for complete search history.

(56) References Cited

U.S. PATENT DOCUMENTS

| | | | |
|---|---|---|---|
| 10,380,585 B2 | 8/2019 | Harris et al. | |
| 10,878,406 B2 | 12/2020 | Dao et al. | |
| 11,159,306 B2 | 10/2021 | Ow et al. | |
| 11,727,389 B2 | 8/2023 | Dao et al. | |
| 11,748,748 B2 | 9/2023 | Harris et al. | |
| 2015/0235203 A1 | 8/2015 | Polak et al. | |
| 2016/0224977 A1* | 8/2016 | Sabba | G06Q 20/385 |
| 2016/0224983 A1 | 8/2016 | Cash | |
| 2018/0293573 A1 | 10/2018 | Ortiz et al. | |
| 2019/0102774 A1 | 4/2019 | Koeppel et al. | |
| 2019/0164155 A1 | 5/2019 | Hosp | |
| 2019/0384896 A1 | 12/2019 | Jones | |
| 2020/0302442 A1 | 9/2020 | Hosp | |
| 2020/0387891 A1 | 12/2020 | Paschini et al. | |
| 2022/0067712 A1 | 3/2022 | Sarin | |
| 2023/0117430 A1 | 4/2023 | Quigley et al. | |
| 2023/0123346 A1 | 4/2023 | Quigley et al. | |
| 2023/0124806 A1 | 4/2023 | Quigley et al. | |
| 2023/0130594 A1 | 4/2023 | Quigley et al. | |
| 2023/0131603 A1 | 4/2023 | Quigley et al. | |
| 2023/0274245 A1 | 8/2023 | Quigley et al. | |

* cited by examiner

*Primary Examiner* — Catherine Thiaw
*Assistant Examiner* — Nega Woldemariam
(74) *Attorney, Agent, or Firm* — Banner & Witcoff, Ltd.

(57) ABSTRACT

Aspects of the disclosure relate to virtual tokens. A computing platform may generate, based on approval of a first authentication token, a second authentication token corresponding to an individual. The computing platform may receive an event processing request corresponding to the individual and the second authentication token. The computing platform may analyze the second authentication token to identify whether or not the second authentication token satisfies one or more predetermined conditions. Based on identifying that at least one of the one or more predetermined conditions is satisfied, the computing platform may execute further authentication measures for the event processing request. Based on identifying that the further authentication measures are satisfied, the computing platform may process the event processing request.

15 Claims, 9 Drawing Sheets

100

102

111

112

Virtual Token Management Platform

Processor(s)

Memory(s)

Virtual Token Management Module
112a

Virtual Token Management Database
112b

113

Communication Interface(s)

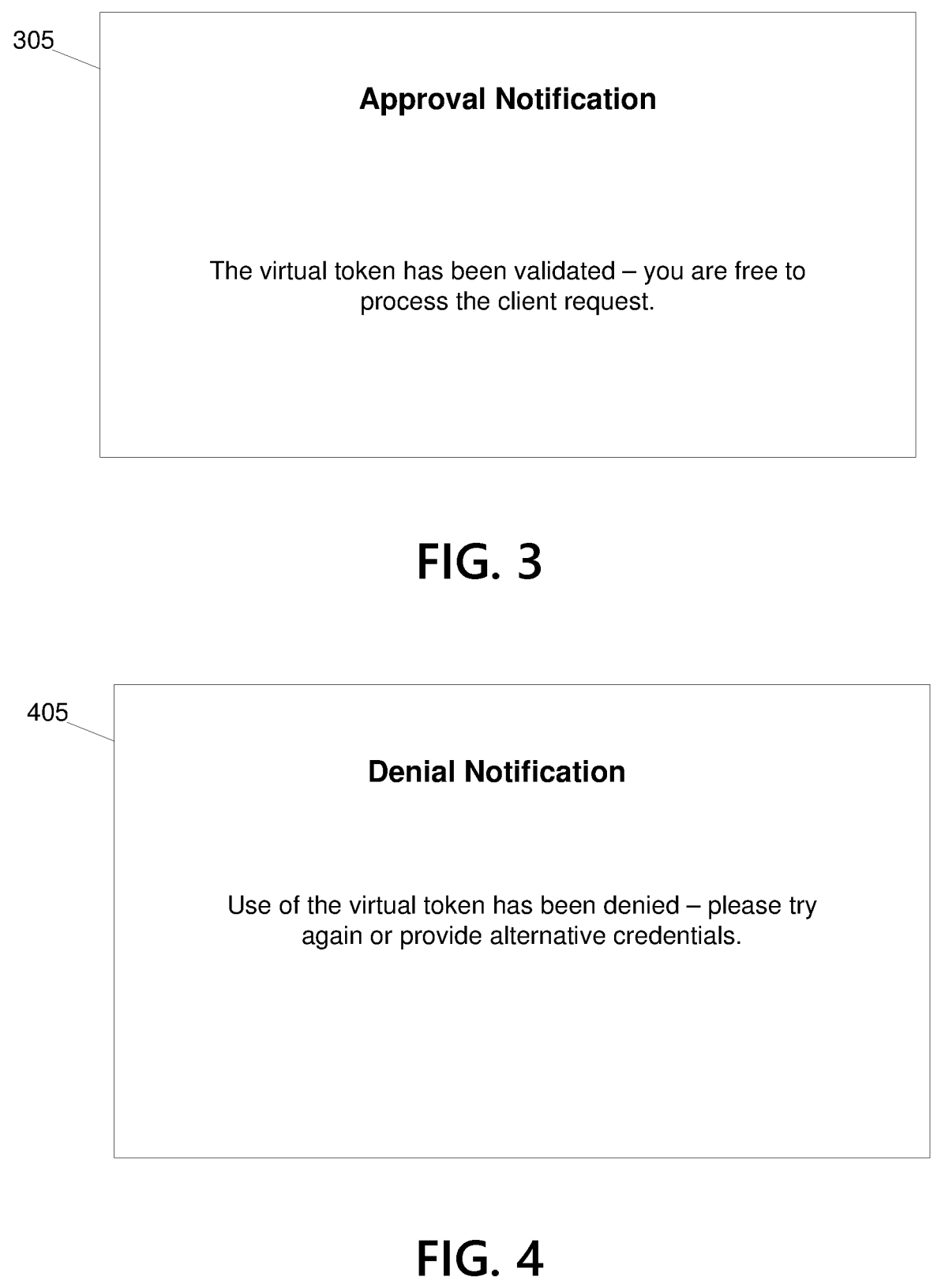

305

Approval Notification

The virtual token has been validated – you are free to process the client request.

Denial Notification

Use of the virtual token has been denied – please try again or provide alternative credentials.

FIG. 4

TOKEN VALIDATION FOR EVENT PROCESSING APPROVAL

BACKGROUND

Aspects of the disclosure relate to the use of virtual tokens. In some instances, virtual tokens may be used to replace the storage of sensitive information (e.g., card numbers, or the like). As a result, such virtual tokens may be representative of the corresponding sensitive information. In some instances, a hold or lock may be placed on a first instrument corresponding to the sensitive information (e.g., a card, or the like). In these instances, requested events may be declined due to a current status of the first instrument. For example, in some instances, such requests may be approved or declined (e.g., based on the status) without routing the requests for evaluation based on other parameters/information. With the increased reliance on electronic requests, it may be important to develop alternative methods for validating the sensitive information in instances where a singular instrument, corresponding to the sensitive information, may be unavailable.

SUMMARY

Aspects of the disclosure provide effective, efficient, scalable, and convenient technical solutions that address and overcome the technical problems associated with virtual tokens. In accordance with one or more embodiments of the disclosure, a computing platform comprising at least one processor, a communication interface, and memory storing computer-readable instructions may generate, based on approval of a first authentication token, a second authentication token, which may correspond to an individual. The computing platform may receive an event processing request corresponding to the individual and the second authentication token. The computing platform may analyze the second authentication token to identify whether or not the second authentication token satisfies one or more predetermined conditions, including: 1) the second authentication token was generated based on another authentication token, 2) the second authentication token was generated by the computing platform, or 3) the second authentication token is associated with an enterprise of the computing platform. Based on identifying that at least one of the one or more predetermined conditions is satisfied, the computing platform may execute further authentication measures for the event processing request. Based on identifying that the further authentication measures are satisfied, the computing platform may process the event processing request.

In one or more instances, the computing platform may receive, from a merchant computing device, the first authentication token and a tokenization request. The computing platform may identify, prior to generating the second authentication token, that the first authentication token is approved.

In one or more examples, the tokenization request may include a primary account number (PAN) for the individual. In one or more examples, the computing platform may analyze a funding primary account number (FPAN) status corresponding to the event processing request, which may indicate, for a payment card corresponding to the event processing request, one or more of: the payment card is inactive or locked, or the payment card is active.

In one or more instances, analyzing the second authentication token to identify whether or not the second authentication token satisfies the one or more predetermined conditions may be based on identifying that the FPAN status indicates that the payment card is inactive or locked. In one or more instances, processing the event processing request may include processing, despite the FPAN status indicating that the payment card is inactive or locked, the event processing request.

In one or more examples, based on identifying that none of the one or more predetermined conditions are satisfied, the computing platform may: 1) decline the event processing request, and 2) send, to a merchant computing device, an indication that the event processing request is declined and one or more commands directing the merchant computing device to display the indication, which may cause the merchant computing device to display the indication. In one or more examples, the event processing request may be declined based on an FPAN status of a payment card corresponding to the event processing request.

In one or more instances, the further authentication measures may include one or more of: verify that an account of the individual comprises sufficient funds to satisfy the event processing request, or perform a fraud analysis on the event processing request. In one or more instances, processing the event processing request may include causing an amount of funds corresponding to the event processing request to be relocated from an account of the individual to an account of an enterprise corresponding to the event processing request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative user interfaces for improved event processing approval through token validation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for improved event processing are described herein. For example, currently, if a funding PAN (FPAN) is inactive or locked, token transactions may be declined due to a card status. Described herein are systems and methods that implement special processing, such that in certain cases, even if the FPAN is inactive or locked, a financial transaction may still be conducted. This may allow customers to begin using tokens in near real time while they wait on their physical cards to be received and also provides an option to go fully digital and not use physical cards.

These systems/methods may introduce new logic for financial card authorization, which may determine conditions in which a funding PAN status may be ignored for decision making. For example, if a transaction is from a merchant or the token was created using another approved token, then the system might not decline a token transaction if the funding PAN is locked or inactive.

Figure 1A:
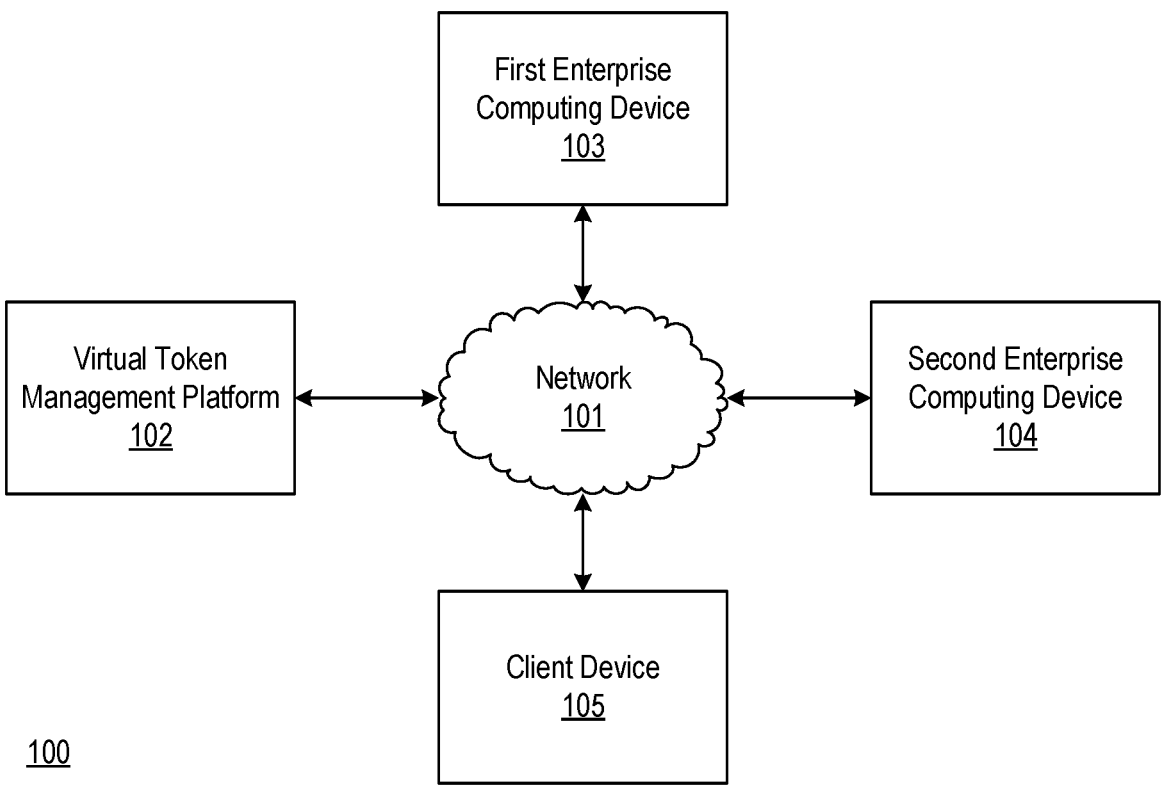
FIGS. 1A-1B depict an illustrative computing environment for improved event processing approval through token validation in accordance with one or more example embodiments.
Figure 1B:
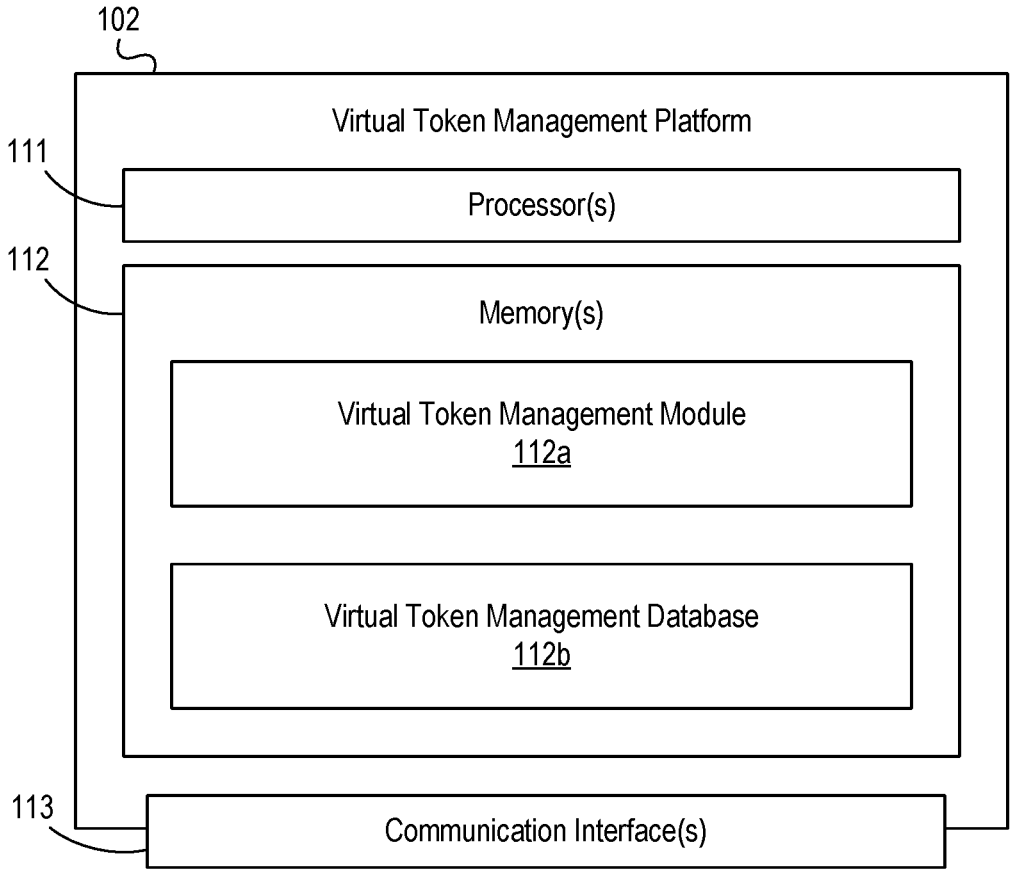

FIGS. 1A-1B depict an illustrative computing environment for improved event processing approval through token validation in accordance with one or more example embodiments. Referring to FIG. 1A, computing environment 100 may include one or more computer systems. For example, computing environment 100 may include a virtual token management platform 102, first enterprise computing device 103, second enterprise computing device 104, and client device 105.

As described further below, virtual token management platform 102 may be a computer system that includes one or more computing devices (e.g., servers, server blades, or the like) and/or other computer components (e.g., processors, memories, communication interfaces) that may be used to provide virtual token generation and validation services as described further below. For example, virtual token management platform 102 may be configured to generate virtual tokens based on validation of other virtual tokens, and/or otherwise. In some instances, the virtual token management platform 102 may be configured to distinguish between types of tokens, and, in some instances, may be configured to route requests for further authorization measures (rather than declining the requests) regardless of a card status corresponding to the request (e.g., regardless of whether the card is inactive, locked, or the like).

First enterprise computing device 103 may be and/or otherwise include a laptop computer, desktop computer, mobile device, tablet, smartphone, server, server blade, and/or other device that may be used to request and/or otherwise store virtual tokens on behalf of a token user (e.g., such as a merchant, device company, or the like). In some instances, first enterprise computing device 103 may be configured to display one or more user interfaces (e.g., authorization approval interfaces, authorization denial interfaces, or the like).

Second enterprise computing device 104 may be and/or otherwise include a laptop computer, desktop computer, mobile device, tablet, smartphone, server, server blade, and/or other device that may be used to approve tokenization and/or provide token validation services on behalf of an enterprise organization, such as a financial institution.

Although first enterprise computing device 103 (e.g., on behalf of a merchant and/or other enterprise organization) and second enterprise computing device 104 (e.g., on behalf of a financial institution) are shown, any number of enterprise user devices may be deployed (e.g., on behalf of financial institutions and/or token users) without departing from the scope of the disclosure.

Client device 105 may be and/or otherwise include a laptop computer, desktop computer, mobile device, tablet, smartphone, and/or other device that may be used to provide client requests (e.g., customer orders, and/or other requests)

to be processed using the virtual tokens. In some instances, client device 105 may be configured to display one or more user interfaces (e.g., order processing confirmations, error/denial notifications, or the like). Although a single client device 105 is shown, any number of client devices 105 may be deployed without departing from the scope of the disclosure.

Computing environment 100 also may include one or more networks, which may interconnect virtual token management platform 102, first enterprise computing device 103, second enterprise computing device 104, and client device 105. For example, computing environment 100 may include a network 101 (which may interconnect, e.g., virtual token management platform 102, first enterprise computing device 103, second enterprise computing device 104, and client device 105).

In one or more arrangements, virtual token management platform 102, first enterprise computing device 103, second enterprise computing device 104, and client device 105 may be any type of computing device capable of sending and/or receiving requests and processing the requests accordingly. For example, virtual token management platform 102, first enterprise computing device 103, second enterprise computing device 104, client device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of virtual token management platform 102, first enterprise computing device 103, second enterprise computing device 104, and client device 105 may, in some instances, be special-purpose computing devices configured to perform specific functions.

Referring to FIG. 1B, virtual token management platform 102 may include one or more processors 111, memory 112, and communication interface 113. A data bus may interconnect processor 111, memory 112, and communication interface 113. Communication interface 113 may be a network interface configured to support communication between virtual token management platform 102 and one or more networks (e.g., network 101, or the like). Memory 112 may include one or more program modules having instructions that when executed by processor 111 cause virtual token management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of virtual token management platform 102 and/or by different computing devices that may form and/or otherwise make up virtual token management platform 102. For example, memory 112 may have, host, store, and/or include virtual token management module 112a and virtual token management database 112b.

Virtual token management module 112a may have instructions that direct and/or cause virtual token management platform 102 to provide improved token generation and validation methods, as discussed in greater detail below. Virtual token management database 112b may store information used by virtual token management module 112a and/or virtual token management platform 102 in application of advanced techniques to provide improved token generation, token validation, and/or in performing other functions.

Figure 2A:
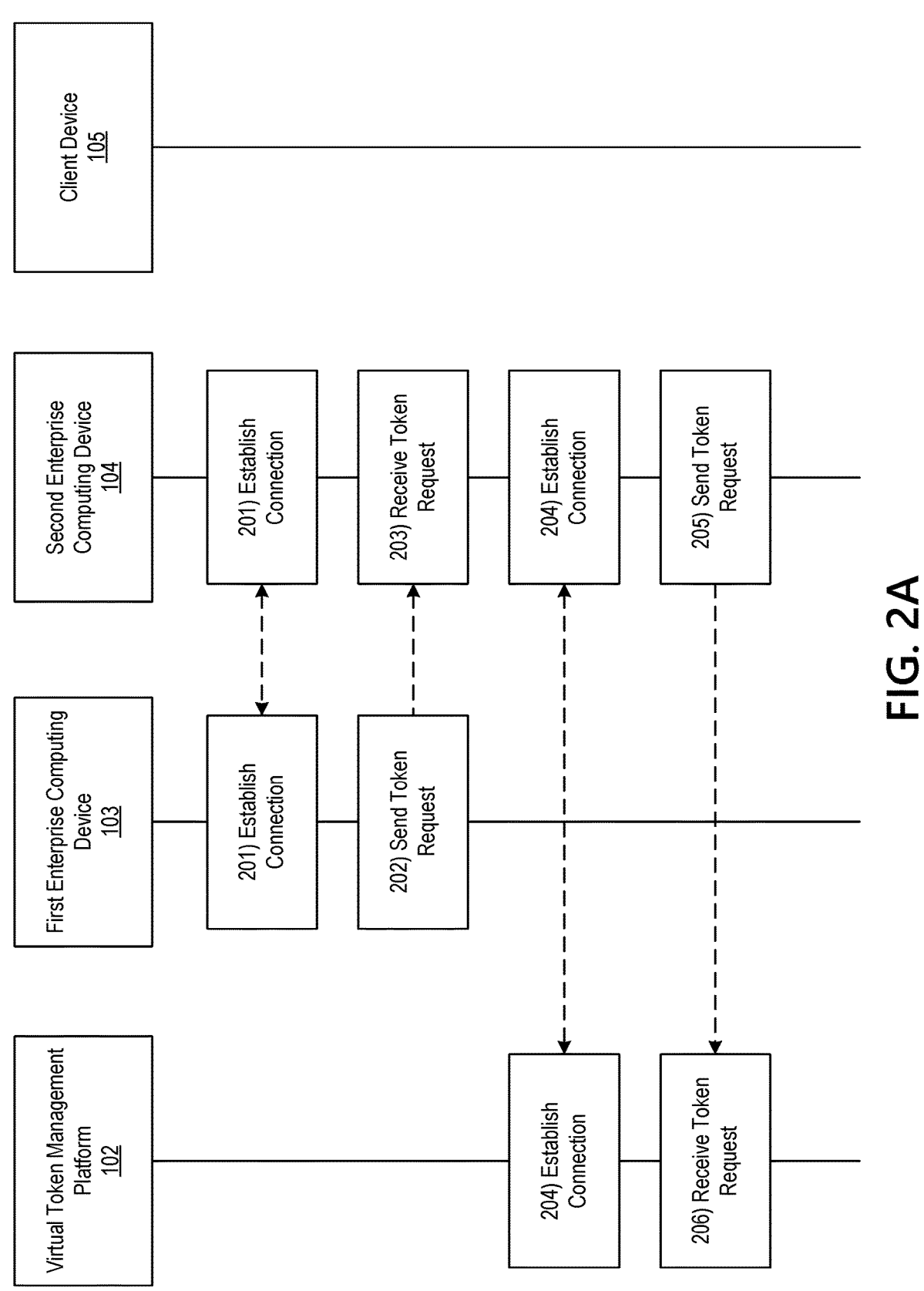
FIGS. 2A-2E depict an illustrative event sequence for improved event processing approval through token validation in accordance with one or more example embodiments.

FIGS. 2A-2E depict an illustrative event sequence for improved event processing approval through token validation in accordance with one or more example embodiments. Referring to FIG. 2A, at step 201, the first enterprise computing device 103 may establish a connection with the second enterprise computing device 104. For example, the first enterprise computing device 103 may establish a first wireless data connection with the second enterprise computing device 104 to link the first enterprise computing device 103 to the second enterprise computing device 104 (e.g., in preparation for sending tokenization requests). In some instances, the first enterprise computing device 103 may identify whether or not a connection is already established with the second enterprise computing device 104. If a connection is not yet established with the second enterprise computing device 104, the first enterprise computing device 103 may establish the first wireless data connection as described herein. If a connection is already established with the second enterprise computing device 104, the first enterprise computing device 103 might not re-establish the connection.

At step 202, the first enterprise computing device 103 may send a token request (e.g., a request to generated a token) to the second enterprise computing device 104. For example, the first enterprise computing device 103 may be affiliated with a merchant and/or other token requestor, and the second enterprise computing device 104 may be affiliated with a card network and/or other financial institution, which may, e.g., offer various financial instruments (such as credit cards, debit cards, and/or other instruments). In sending the token request, the first enterprise computing device 103 may send a request to generate a virtual card (e.g., virtual token), which may represent or otherwise be linked to a particular physical financial instrument. In some instances, the first enterprise computing device 103 may send, along with the token request, an existing token (which may, e.g., have been previously stored at the first enterprise computing device 103, and may include information such account information, payment information, identity information, or the like). In some instances, the first enterprise computing device 103 may send, along with the token request, a primary account number (PAN) for an individual to be associated with the token. In some instances, the first enterprise computing device 103 may send the token request while the first wireless data connection is established.

At step 203, the second enterprise computing device 104 may receive the token request, sent at step 202. For example, the second enterprise computing device 104 may receive the token request while the first wireless data connection is established. In some instances, the second enterprise computing device 104 may receive, along with the token request, an existing token.

At step 204, the second enterprise computing device 104 may establish a connection with the virtual token management platform 102. For example, the second enterprise computing device 104 may establish a second wireless data connection with the virtual token management platform 102 to link the second enterprise computing device 104 to the virtual token management platform 102 (e.g., in preparation for initiating tokenization processes). In some instances, the second enterprise computing device 104 may identify whether or not a connection is already established with the virtual token management platform 102. If a connection is already established with the virtual token management platform 102, the second enterprise computing device 104 might not re-establish the connection. Otherwise, if a connection is not yet established with the virtual token management platform 102, the second enterprise computing device 104 may establish the second wireless data connection as described herein.

At step 205, the second enterprise computing device 104 may send a token request to the virtual token management platform 102. For example, the second enterprise computing device 104 may forward the token request received at step 203, and/or otherwise initiate tokenization. In some instances, the second enterprise computing device 104 may send the token request while the second wireless data connection is established. In some instances, the second enterprise computing device 104 may also send the existing token.

At step 206, the virtual token management platform 102 may receive the token request sent at step 205. For example, the virtual token management platform 102 may receive the token request via the communication interface 113 and while the second wireless data connection is established.

Figure 2B:
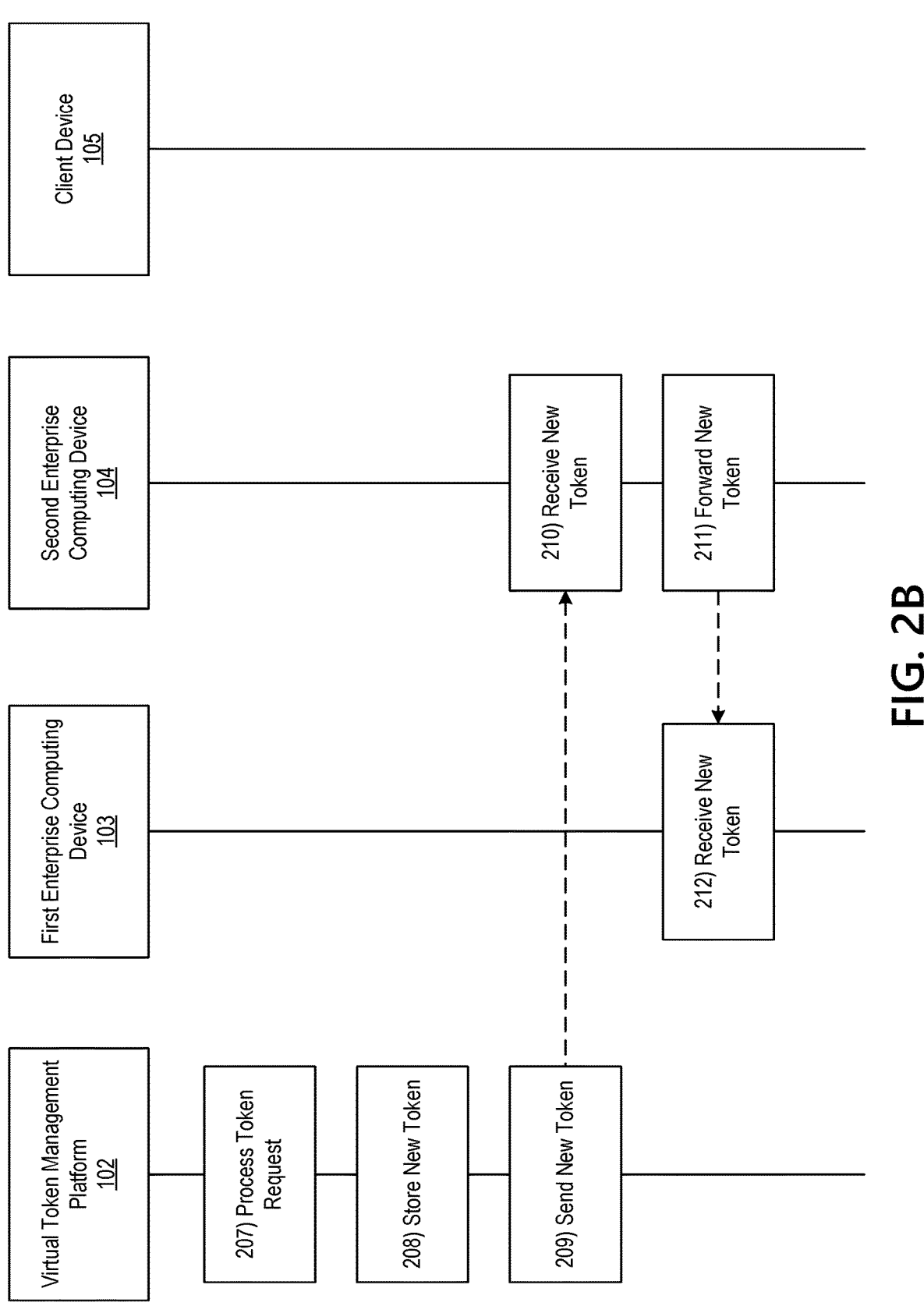

Referring to FIG. 2B, at step 207, the virtual token management platform 102 may generate a virtual token responsive to the token request. For example, if the first enterprise computing device 103 and/or second enterprise computing device 104 requested a token for a particular financial instrument or payment device (e.g., a credit card, or the like), the virtual token management platform 102 may generate a corresponding virtual token of the physical financial instrument or payment device. In some instances, the virtual token management platform 102 may validate the token sent by the first enterprise computing device 103 and/or second enterprise computing device 104, and may generate the virtual token in response to successfully validating the received token (e.g., generate a second token based on validation of a first token, or the like).

At step 208, the virtual token management platform 102 may store the virtual token, generated at step 207. In some instances, the virtual token management platform 102 may store a correlation between the generated virtual token and the received token (e.g., a correlation between a first token, provided to the virtual token management platform 102, and a second token, generated by the virtual token management platform 102 based on validation of the first token).

At step 209, the virtual token management platform 102 may send the generated virtual token to the second enterprise computing device 104. For example, the virtual token management platform 102 may send the virtual token (e.g., generated at step 207) to the second enterprise computing device 104 via the communication interface 113 and while the second wireless data connection is established.

At step 210, the second enterprise computing device 104 may receive the virtual token sent at step 209. For example, the second enterprise computing device 104 may receive the generated virtual token while the second wireless data connection is established. In some instances, the second enterprise computing device 104 may record an approval of the virtual token, along with the virtual token.

At step 211, the second enterprise computing device 104 may forward the virtual token, received at step 210, to the first enterprise computing device 103 (e.g., in response to the token request sent by the first enterprise computing device 103 at step 202). For example, the second enterprise computing device 104 may forward the virtual token to the first enterprise computing device 103 while the first wireless data connection is established.

At step 212, the first enterprise computing device 103 may receive the virtual token sent at step 211. For example, the first enterprise computing device 103 may receive the virtual token while the first wireless data connection is established.

In some instances, the first enterprise computing device 103 may record an approval of the virtual token, along with the virtual token.

While steps 201-212 describe a token approval/generation process, steps 213-226 describe the use of this token in an authorization process (as is described further below).

Figure 2C:
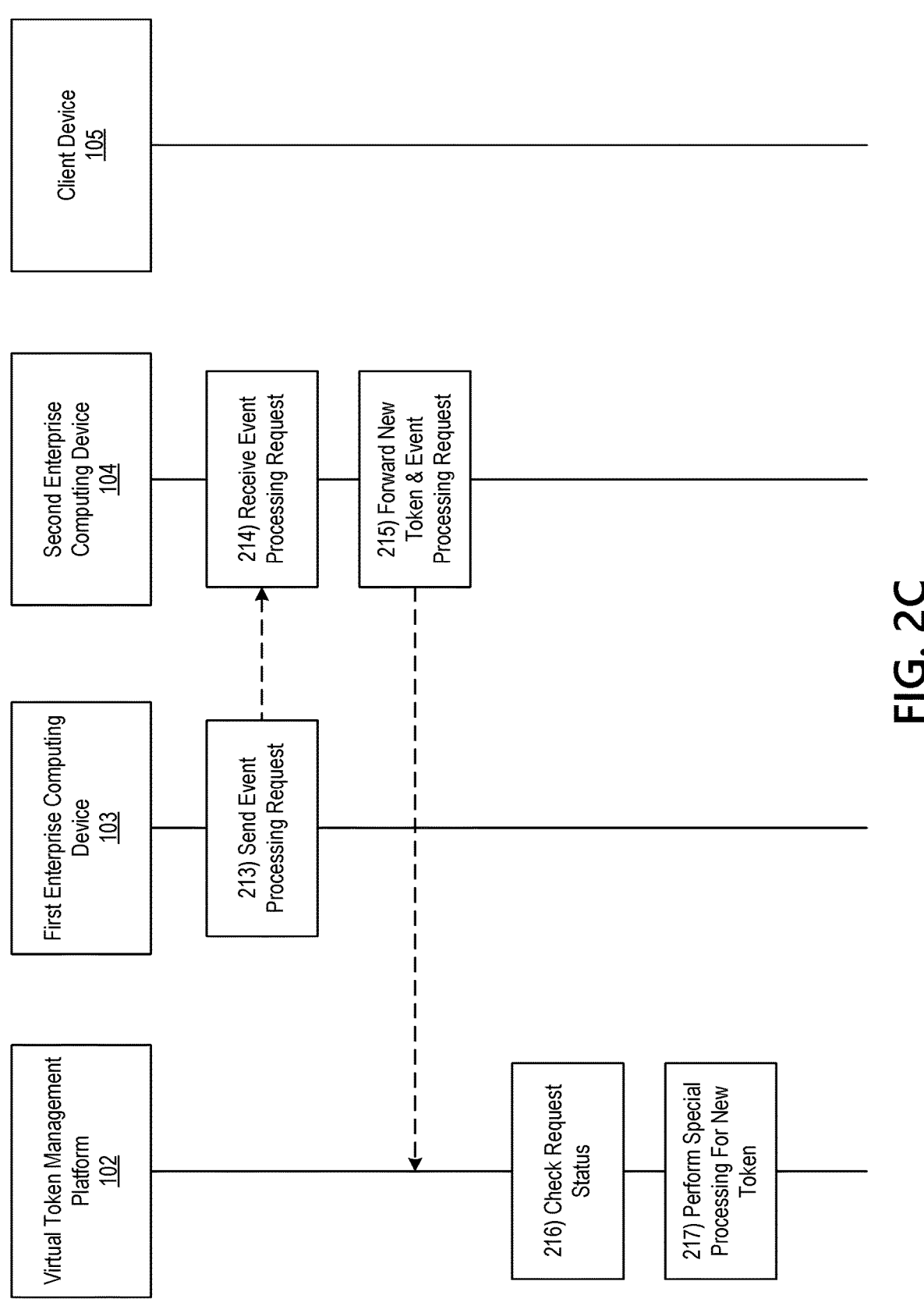

Referring to FIG. 2C, at step 213, the first enterprise computing device 103 may send an event processing request to the second enterprise computing device 104. In some instances, in sending the event processing request, the first enterprise computing device 103 may send a request to process a transaction and/or other event using the physical card (or other financial instrument) represented by the generated virtual token (e.g., the second token generated based on a first token). In some instances, the first enterprise computing device 103 may also send the virtual token. In some instances, the first enterprise computing device 103 may send the event processing request based on a request from the client device 105. In some instances, the first enterprise computing device 103 may send the event processing request to the second enterprise computing device 104 while the first wireless data connection is established.

At step 214, the second enterprise computing device 104 may receive the event processing request sent at step 213. In some instances, the second enterprise computing device 104 may receive the event processing request while the first wireless data connection is established.

In some instances, the second enterprise computing device 104 may validate the virtual token. In instances where the second enterprise computing device 104 successfully validates the virtual token, the second enterprise computing device 104 may proceed to step 215. Otherwise, the second enterprise computing device 104 might not proceed to step 215 (and may instead perform actions similar to those described below with regard to steps 220-224, such as sending a notification of an error, declined event, or the like).

At step 215, the second enterprise computing device 104 may forward the virtual token and the event processing request to the virtual token management platform 102. For example, the second enterprise computing device 104 may forward the virtual token and the event processing request to the virtual token management platform 102 while the second wireless data connection is established.

At step 216, the virtual token management platform 102 may check an FPAN status corresponding to the event processing request (e.g., corresponding to the payment card associated with the event processing request). In instances where the virtual token management platform 102 identifies that the FPAN status indicates that the payment card is active, the virtual token management platform 102 may proceed to step 225. Otherwise, if the virtual token management platform 102 identifies that the FPAN status indicates that the payment card is inactive or locked, the virtual token management platform 102 may proceed to step 217.

At step 217, the virtual token management platform 102 may perform special processing with regard to the virtual token by comparing features of the virtual token against a list of known predetermined conditions. For example, the virtual token management platform 102 may identify whether the virtual token was created based on an existing token (e.g., based on validation of the existing token). Additionally or alternatively, the virtual token management platform 102 may identify whether the virtual token was sent from a merchant. Additionally or alternatively, the virtual token management platform 102 may identify whether or not the virtual token is affiliated with an enterprise organization for the virtual token management platform 102. If the virtual token management platform 102 identifies that at least one of the above noted conditions is satisfied, the virtual token management platform 102 may proceed to step 225. Otherwise, if the virtual token management platform 102 identifies that none of the above noted conditions are satisfied, the virtual token management platform 102 may proceed to step 218.

Figure 2D:
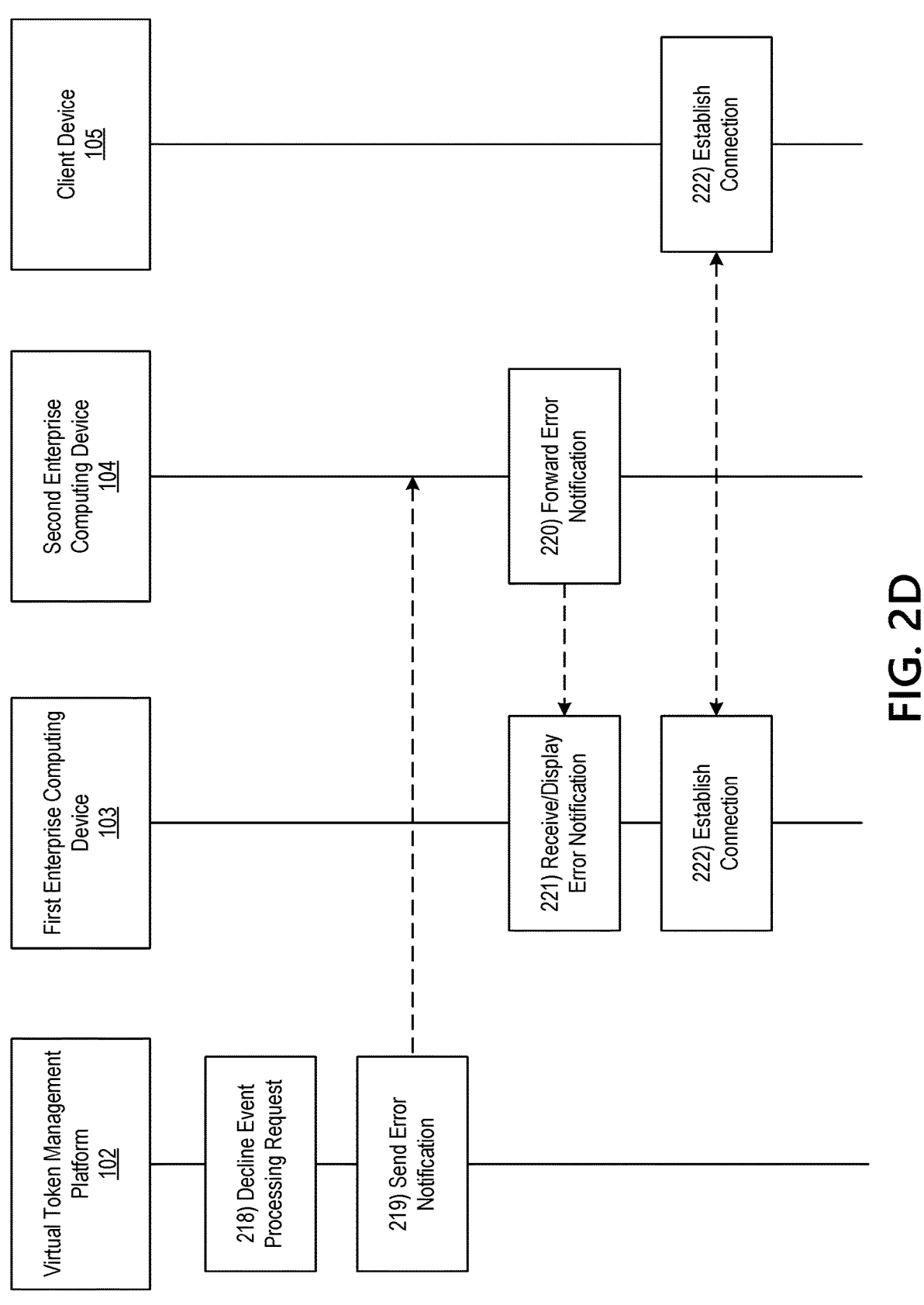

Referring to FIG. 2D, at step 218, the virtual token management platform 102 may decline the event processing request based on the results of the special processing performed at step 217. For example, the virtual token management platform 102 may identify that because the virtual token does not satisfy at least one of the predetermined conditions, the FPAN status of the payment card cannot be overlooked, the event processing request cannot be routed for additional authorization, or the like.

At step 219, the virtual token management platform 102 may send an error notification to the second enterprise computing device 104 based on declining the event processing request. For example, the virtual token management platform 102 may send the error notification via the communication interface 113 and while the second wireless data connection is established. In some instances, the virtual token management platform 102 may also send one or more commands directing the first enterprise computing device 104 to display the error notification.

At step 220, the second enterprise computing device 104 may forward the error notification (received at step 219) to the first enterprise computing device 103. For example, the second enterprise computing device 104 may forward the error notification to the first enterprise computing device 103 while the first wireless data connection is established. In some instances, the second enterprise computing device 104 may forward the one or more commands directing the first enterprise computing device 103 to display the error notification.

In some instances, prior to forwarding the error notification, the second enterprise computing device 104 may record the decision by the virtual token management platform 102 not to process the requested event. For example, the second enterprise computing device 104 may record the decision in a stored log, distributed ledger, and/or otherwise.

At step 221, the first enterprise computing device 103 may receive the error notification forwarded at step 220. In some instances, the first enterprise computing device 103 may also receive the one or more commands directing the first enterprise computing device 103 to display the error notification. Based on or in response to the one or more commands directing the first enterprise computing device 103 to display the error notification, the first enterprise computing device 103 may display the error notification. For example, the first enterprise computing device 103 may display a graphical user interface similar to graphical user interface 405, which is illustrated in FIG. 4.

At step 222, the first enterprise computing device 103 may establish a connection with the client device 105. For example, the first enterprise computing device 103 may establish a third wireless data connection with the client device 105 to link the first enterprise computing device 103 with the client device 105 (e.g., in preparation for sending the error notification). In some instances, the first enterprise computing device 103 may identify whether or not a connection is already established with the client device 105. If a connection is already established with the client device 105, the first enterprise computing device 103 might not re-establish the connection. If a connection is not yet established with the client device 105, the first enterprise computing device 103 may establish the third wireless data connection as described herein.

Figure 2E:
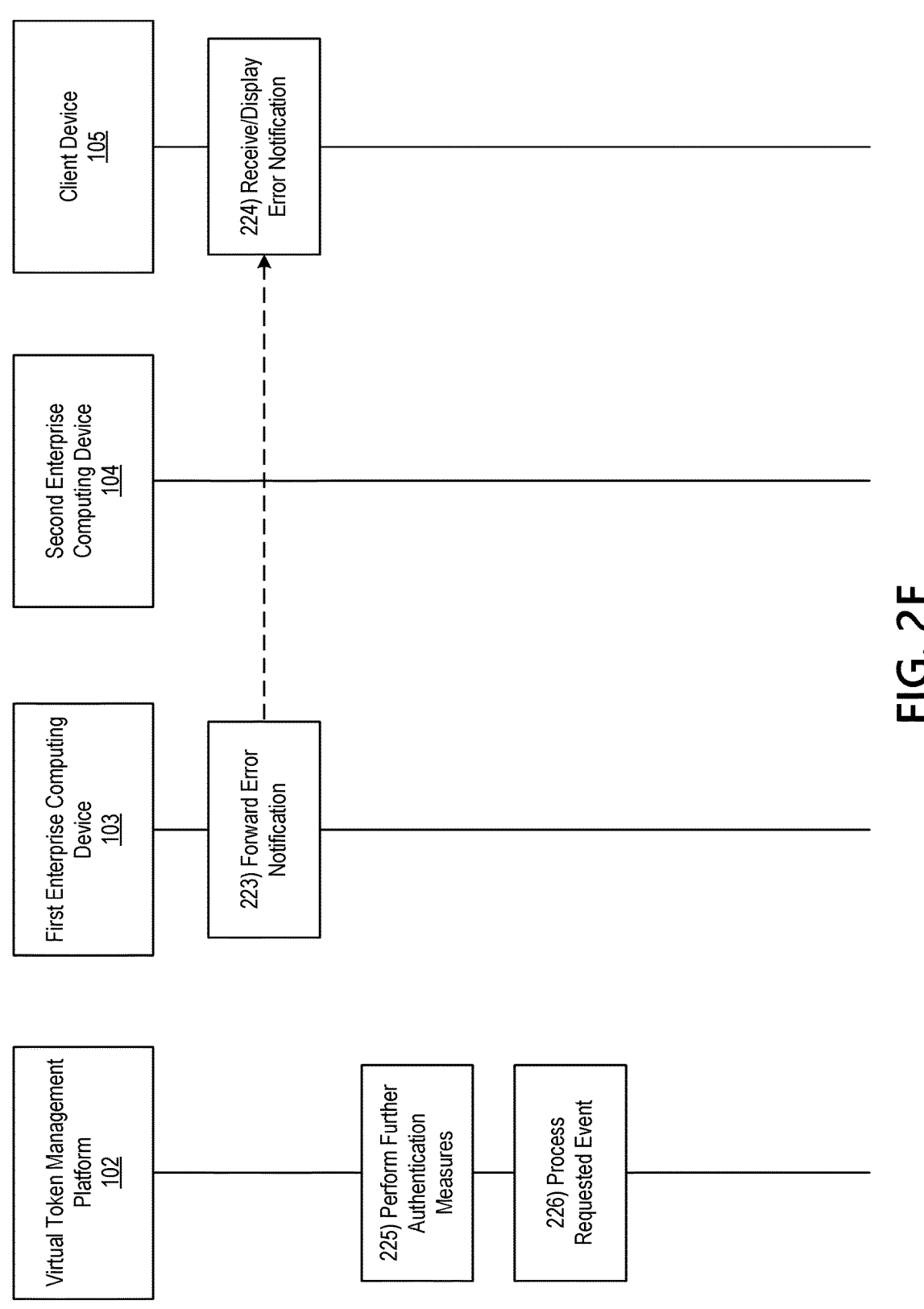

Referring to FIG. 2E, at step 223, the first enterprise computing device 103 may forward the error notification to the client device 105. For example, the first enterprise computing device 103 may forward the error notification to the client device 105 while the third wireless data connection is established. In some instances, the first enterprise computing device 103 may also forward commands directing the client device 105 to display the error notification.

At step 224, the client device 105 may receive the error notification sent at step 223. For example, the client device 105 may receive the error notification while the third wireless data connection is established. In some instances, the client device 105 may also receive the one or more commands directing the client device 105 to display the error notification. Based on or in response to the one or more commands directing the client device 105 to display the error notification, the client device 105 may display the error notification (which may e.g., be similar to graphical user interface 405 of FIG. 4). The event sequence may then be complete.

Returning to step 217, if the virtual token management platform 102 identified that at least one of the predetermined conditions was satisfied, the virtual token management platform 102 may have proceeded to step 225. At step 225, the virtual token management platform 102 may perform further authentication measures to validate the event processing request (e.g., even if the physical payment device is inactive or locked). For example, by identifying that at least one of the predetermined conditions was satisfied, the virtual token management platform 102 might not have validated the event processing request itself, but rather, it may have identified that the request may proceed for further review without being declined simply due to the FPAN status (e.g., the payment card being locked, inactive, or the like). Accordingly, a user may be able to execute requests during an interim period in which their card is lost, locked, inactive, or the like (in contrast to such requests being immediately declined due to the FPAN status).

In some instances, the further authentication measures may include verifying that an account of the user includes sufficient funds to support the requested event, performing fraud analysis detection, and/or other measures. In instances where the further authentication measures are satisfied, the virtual token management platform 102 may proceed to step 226. Otherwise, if the further authentication measures are not satisfied, the virtual token management platform 102 may decline the request and send an error notification as is described above with regard to steps 218-224.

At step 226, the virtual token management platform 102 may process the requested event. For example, the virtual token management platform 102 may cause a transfer of funds from an account of a user of the client device 105 to an account of the first enterprise computing device 103 (e.g., from a client/customer to a merchant, or the like). In some instances, the virtual token management platform 102 may cause a notification to be sent and/or displayed at the first enterprise computing device 103 and/or the client device 105. For example, the virtual token management platform 102 may send and/or cause display of a graphical user interface similar to graphical user interface 305, which is illustrated in FIG. 3.

By operating in this way, the virtual token management platform 102 may break the dependency between virtual tokens and a corresponding physical payment card, and thus may enable requests to be processed despite an inactive/locked payment card (e.g., based on the corresponding token).

Figure 5:
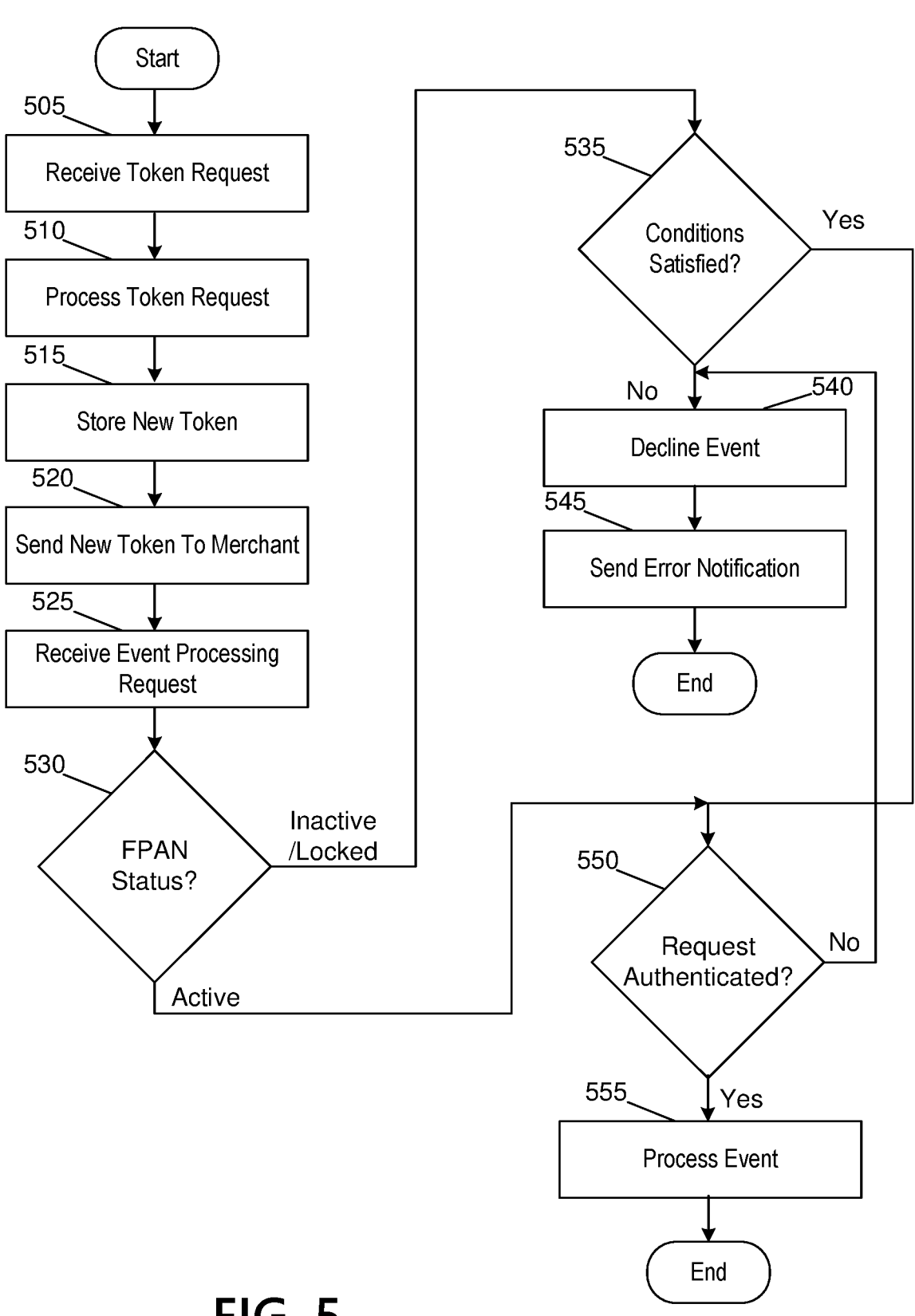
FIG. 5 depicts an illustrative method for improved event processing approval through token validation in accordance with one or more example embodiments.

FIG. 5 depicts an illustrative method for improved event processing approval through token validation in accordance with one or more example embodiments. At step 505, a computing platform may receive a token creation request. At step 510, the computing platform may process the token creation request to generate a new token. At step 515, the computing platform may store the new token. At step 520, the computing platform may send the new token to an enterprise computing device (such as a merchant device). At step 525, the computing platform may receive an event processing request, and in some instances, the new token. At step 530, the computing platform may identify an FPAN status of a payment card corresponding to the event processing request. If the FPAN status indicates that the payment card is inactive/locked, the computing platform may proceed to step 535. Otherwise, if the FPAN status indicates that the payment card is active, the computing platform may proceed to step 550.

At step 550, the computing platform may perform one or more additional authentication measures. If the request is not authenticated, the computing platform may proceed to step 540. Otherwise, if the request is authenticated, the computing platform may proceed to step 555 to process the requested event.

Returning to step 530, if the FPAN status indicates that the payment card is inactive/locked, the computing platform may proceed to step 535. At step 535, the computing platform may perform special processing to identify whether at least one of a set of predetermined conditions are satisfied. If at least one of the conditions are satisfied, the computing platform may proceed to step 550 to authenticate the request as described above. Otherwise, if none of the conditions are satisfied, the computing platform may proceed to step 540.

At step 540, the computing platform may decline the requested event. At step 545, the computing platform may send an error notification indicating the declined event.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
    send, to a payment device, the generated authentication token;
    generate, based on approval of a first authentication token, a second authentication token, wherein the second authentication token corresponds to a payment device of an individual, wherein the first authentication token is a received token and the second authentication token is a generated authentication token;
    receive an event processing request corresponding to the payment device, wherein the generated authentication token is received along with the event processing request;
    analyze the generated authentication token to identify whether or not the generated authentication token satisfies one or more predetermined conditions, wherein analyzing the generated authentication token to identify whether or not the generated authentication token satisfies the one or more predetermined conditions is based on identifying that a funding primary account number (FPAN) status indicates that a payment card, corresponding to the event processing request, is inactive or locked, wherein the one or more predetermined conditions comprise:
    the generated authentication token was generated based on another approved authentication token,
    the generated authentication token was generated by the computing platform, or
    the generated authentication token is associated with an enterprise of the computing platform;
based on identifying that at least one of the one or more predetermined conditions is satisfied, execute further authentication processes for the event processing request;
based on identifying that the further authentication processes are satisfied, process the event processing request, wherein processing the event processing request comprises processing, despite the FPAN status indicating that the payment card is inactive or locked, the event processing request; and
based on identifying that none of the one or more predetermined conditions are satisfied:
    decline the event processing request, wherein the event processing request is declined based on an FPAN status of the payment card corresponding to the event processing request, and
    send, to a merchant computing device, an indication that the event processing request is declined and one or more commands directing the merchant computing device to display the indication, wherein sending the one or more commands directing the merchant computing device to display the indication causes the merchant computing device to display the indication.

2. The computing platform of claim 1, wherein the memory stores additional computer-readable instructions that, when executed by the at least one processor, cause the computing platform to:
    receive, from the merchant computing device, the received authentication token and a tokenization request; and
    identify, prior to generating the generated authentication token, that the received authentication token is approved.

3. The computing platform of claim 2, wherein the tokenization request comprises a primary account number (PAN) for the payment device associated with the individual.

4. The computing platform of claim 1, wherein analyzing the generated authentication token to identify whether or not the generated authentication token satisfies the one or more predetermined conditions is based on identifying that the FPAN status indicates that the payment card is inactive or locked.

5. The computing platform of claim 1, wherein the further authentication measures comprise one or more of:
    verify that an account of the individual comprises sufficient funds to satisfy the event processing request, or
    perform a fraud analysis on the event processing request.

6. The computing platform of claim 1, wherein processing the event processing request comprises causing an amount of funds corresponding to the event processing request to be transferred from an account of the individual to an account of an enterprise corresponding to the event processing request.

7. A method comprising:
at a computing platform comprising at least one processor, a communication interface, and memory:
generating, based on approval of a first authentication token, a second authentication token, wherein the second authentication token corresponds to a payment device of an individual, wherein the first authentication token is a received token and the second authentication token is a generated authentication token;
send, to the payment device, the generated authentication token;
receiving an event processing request corresponding to the payment device, wherein the generated authentication token is received along with the event processing request;
analyzing the generated authentication token to identify whether or not the generated authentication token satisfies one or more predetermined conditions, wherein analyzing the generated authentication token to identify whether or not the generated authentication token satisfies the one or more predetermined conditions is based on identifying that a funding primary account number (FPAN) status indicates that a payment card, corresponding to the event processing request, is inactive or locked, wherein the one or more predetermined conditions comprise:
the generated authentication token was generated based on another approved authentication token,
the generated authentication token was generated by the computing platform, or
the generated authentication token is associated with an enterprise of the computing platform;
based on identifying that at least one of the one or more predetermined conditions is satisfied, executing further authentication processes for the event processing request; and
based on identifying that the further authentication processes are satisfied, processing the event processing request, wherein processing the event processing request comprises processing, despite the FPAN status indicating that the payment card is inactive or locked, the event processing request; and
based on identifying that none of the one or more predetermined conditions are satisfied:
decline the event processing request, wherein the event processing request is declined based on the FPAN status of the payment card corresponding to the event processing request, and
send, to a merchant computing device, an indication that the event processing request is declined and one or more commands directing the merchant computing device to display the indication, wherein sending the one or more commands directing the merchant computing device to display the indication causes the merchant computing device to display the indication.

8. The method of claim 7, further comprising:
receiving, from the merchant computing device, the received authentication token and a tokenization request; and
identifying, prior to generating the generated authentication token, that the received authentication is approved.

9. The method of claim 8, wherein the tokenization request comprises a primary account number (PAN) for the payment device associated with the individual.

10. The method of claim 7, wherein analyzing the generated authentication token to identify whether or not the generated authentication token satisfies the one or more predetermined conditions is based on identifying that the FPAN status indicates that the payment card is inactive or locked.

11. The method of claim 7, wherein the further authentication measures comprise one or more of:
verify that an account of the individual comprises sufficient funds to satisfy the event processing request, or
perform a fraud analysis on the event processing request.

12. One or more non-transitory computer-readable media storing instructions that, when executed by a computing platform comprising at least one processor, a communication interface, and memory, cause the computing platform to:
generate, based on approval of a first authentication token, a second authentication token, wherein the second authentication token corresponds to a payment device of an individual, wherein the first authentication token is a received token and the second authentication token is a generated authentication token;
send, to the payment device, the generated authentication token;
receive an event processing request corresponding to the payment device, wherein the generated authentication token is received along with the event processing request;
analyze the generated authentication token to identify whether or not the generated authentication token satisfies one or more predetermined conditions, wherein analyzing the generated authentication token to identify whether or not the generated authentication token satisfies the one or more predetermined conditions is based on identifying that a funding primary account number (FPAN) status indicates that a payment card, corresponding to the event processing request, is inactive or locked, wherein the one or more predetermined conditions comprise:
the generated authentication token was generated based on another approved authentication token,
the generated authentication token was generated by the computing platform, or
the generated authentication token is associated with an enterprise of the computing platform;
based on identifying that at least one of the one or more predetermined conditions is satisfied, execute further authentication processes for the event processing request;
based on identifying that the further authentication processes are satisfied, process the event processing request, wherein processing the event processing request comprises processing, despite an FPAN status indicating that the payment card is inactive or locked, the event processing request; and
based on identifying that none of the one or more predetermined conditions are satisfied:
decline the event processing request, wherein the event processing request is declined based on the FPAN status of the payment card corresponding to the event processing request, and
send, to a merchant computing device, an indication that the event processing request is declined and one or more commands directing the merchant computing device to display the indication, wherein sending the one or more commands directing the merchant computing device to display the indication causes the merchant computing device to display the indication.

13. The one or more non-transitory computer-readable media of claim 12, wherein the memory stores additional computer-readable instructions that, when executed by the at least one processor, cause the computing platform to:

receive, from the merchant computing device, the received authentication token and a tokenization request; and identify, prior to generating the generated authentication token, that the received authentication token is approved.

14. The one or more non-transitory computer-readable media of claim 13, wherein the tokenization request comprises a primary account number (PAN) for the payment device associated with the individual.

15. The one or more non-transitory computer-readable media of claim 12, wherein analyzing the generated authentication token to identify whether or not the generated authentication token satisfies the one or more predetermined conditions is based on identifying that the FPAN status indicates that the payment card is inactive or locked.

* * * * *